UNITED STATES PATENT OFFICE.

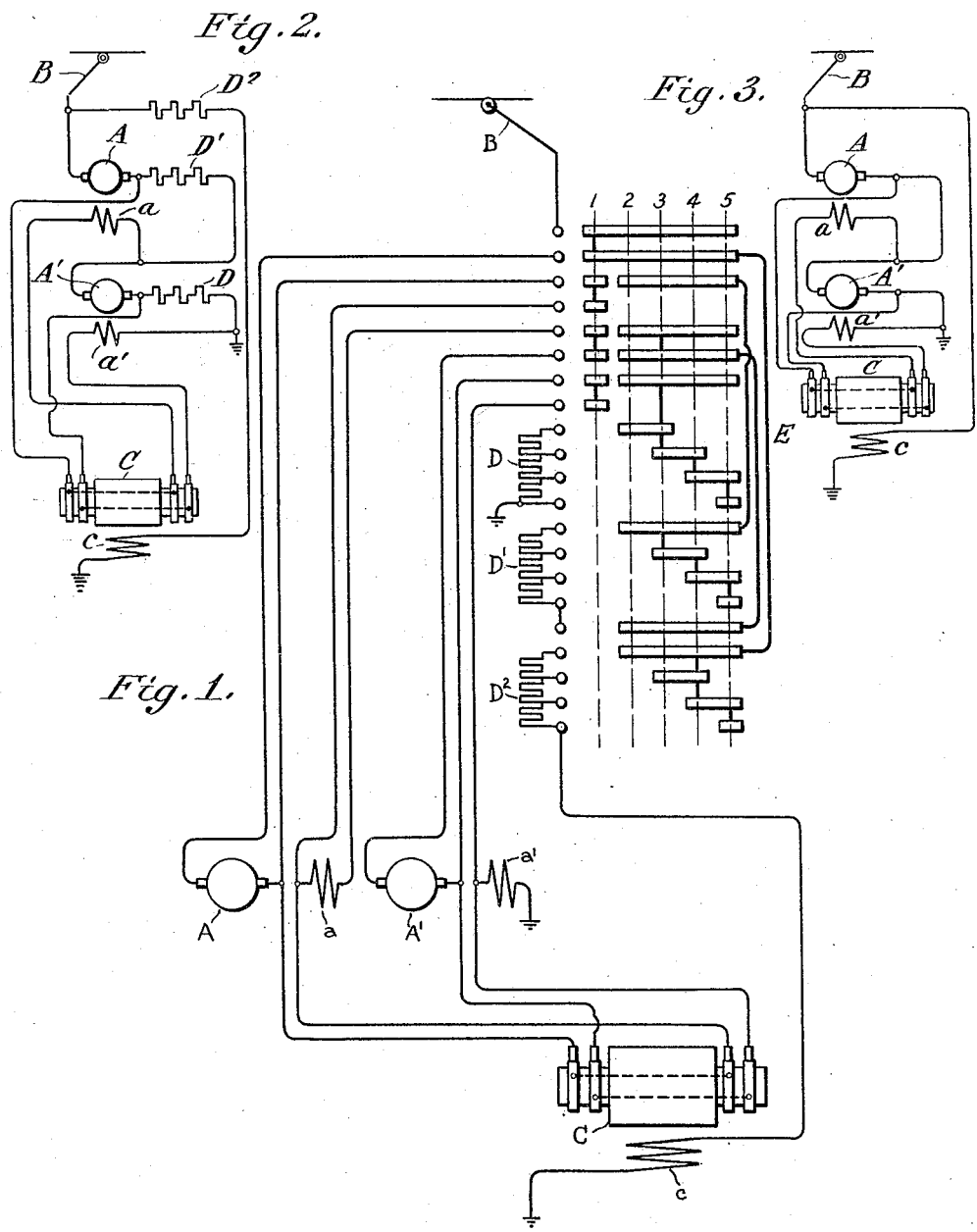

ERNST F. W. ALEXANDERSON, OF SCHENECTADY, NEW YORK, ASSIGNOR TO GENERAL ELECTRIC COMPANY, A CORPORATION OF NEW YORK.

MOTOR CONTROL.

996,390. Specification of Letters Patent. Patented June 27, 1911.

Application filed January 5, 1910. Serial No. 536,512.

*To all whom it may concern.*

Be it known that I, ERNST F. W. ALEXANDERSON, a citizen of the United States, residing at Schenectady, county of Schenectady, State of New York, have invented certain new and useful Improvements in Motor Control, of which the following is a specification.

My invention relates to controlling series motors to cause them to operate as braking generators to return energy to the source.

A method of braking a series motor has heretofore been proposed consisting in inserting an auxiliary source of voltage in series with the motor field without breaking the series connection between motor field and armature, shunting the auxiliary source and motor field by a resistance, and varying the amount of the resistance for controlling the braking effect. By this method of control a series characteristic is superposed on the separately excited characteristics due to the auxiliary source and stable conditions well suited for electric braking are obtained.

My invention consists in a modification of, and improvement in, the method of control and arrangement of apparatus disclosed in that application.

My invention consists, first, in varying the amount of the auxiliary voltage to control the braking effect, thereby increasing the flexibility and extending the range of the control, and second, in providing a low voltage generator with a plurality of armature circuits which may be connected in series with the several fields of a plurality of series motors, so that by controlling the generator field the auxiliary voltages in the motor field circuits are simultaneously controlled.

My invention will best be understood by reference to the accompanying drawing, in which—

Figure 1 shows diagrammatically a plurality of series motors arranged for braking control, in accordance with my invention. Fig. 2 shows a diagram of the circuits in the second position of the controller; and Fig. 3 is a diagram of the circuits in the fifth position of the controller.

In the drawing, A, A' represent the armatures, and $a$, $a'$ the field windings of a pair of series motors. While only two motors are shown, my invention is applicable to the simultaneous control of any number of motors.

B represents diagrammatically a trolley through which the current for the motors is drawn and through which energy is returned to the line when the motors are operating as braking generators.

C represents the armature and $c$ the field winding of a low voltage generator, which may be of the unipolar type, as is diagrammatically indicated, having a plurality of armature circuits, as indicated by the armature conductors shown in dotted lines, and the two sets of collector rings and brushes.

D, D' and $D^2$ represent resistances, of which the first two are adapted to be connected in shunt to the motor fields and the armature circuits of the generator C, and the third is adapted to be connected in series with the generator field $c$ to control the generator voltage.

E represents a controlling switch for connecting the motors for braking and controlling the braking effect. This switch is shown diagrammatically with its contacts developed on a plane surface and with five positions, indicated by the dotted lines numbered one to five. The usual switches for controlling the motors for motor operation and for reversing them are omitted in order to simplify the drawing.

With the switch in the first position, the motors are connected in the usual way in series. The armature circuits of the generator C being short-circuited and its field circuit being open and the circuit of resistances D and D' also being open. In this position of switch E, the motors operate simply as motors. When the switch E is moved to the second position, the circuits will be as shown in Fig. 2. The short circuit is removed from the armature circuits of the generator, so that each armature circuit is inserted in series between a motor armature and its field. At the same time the resistances D, D' are connected, respectively, in shunt to the motor fields $a'$, $a$ and the generator armature circuits in series with them, and the circuit of generator field winding $c$ is closed through the whole of resistance $D^2$. The generator is thus excited with a weak field and produces a low voltage in series with each motor field. The current, due to this voltage, flowing through the motor field and shunt resistance, increases the motor field strength, so that the counter E. M. F. of the motors is raised and current returned to the line. To increase the braking effect, or to maintain this effect as the motor speed and, consequently, the counter E. M. F. falls, the switch E is moved to its other positions. At each step of the switch a portion of resistances D and D' is cut out, and at the same time a portion of resistance D² is cut out so as to strengthen the field of the auxiliary generator. Thus, the auxiliary voltage is increased and the shunt resistance diminished, further strengthening the motor fields and giving them more and more a separately excited characteristic.

In the last position of the switch, the circuit connections of which are shown in Fig. 3, the auxiliary generator has full field strength and the resistances D and D' are wholly short-circuited. Consequently, the motors are then operating as separately-excited generators, and returning the maximum amount of energy to the line. In the other positions of switch E, since the motor fields are still in series with the motor armatures a series characteristic is superposed on the separately-excited characteristic, which gives stable conditions peculiarly suitable for electric braking.

I do not desire to limit myself to the particular arrangement and connections of parts shown and described, but aim in the appended claims to cover all modifications which are within the scope of my invention.

What I claim as new and desire to secure by Letters Patent of the United States, is:—

1. The method of operating a series motor as a braking generator to return energy to the line, which consists in inserting an auxiliary source of voltage in series with the motor field without breaking the series connection between motor field and armature, shunting the motor field and auxiliary source of voltage by a resistance, and varying the voltage of said auxiliary source to control the braking effect.

2. The method of operating a series motor as a braking generator to return energy to the line, which consists in inserting an auxiliary source of voltage in series with the motor field without breaking the series connection between motor field and armature, shunting the motor field and auxiliary source of voltage by a resistance, and varying the voltage of said auxiliary source and the amount of said resistance to control the braking effect.

3. The method of operating a series motor as a braking generator to return energy to the line, which consists in inserting the armature of a low voltage generator in series with the motor field without breaking the series connection between motor field and armature, shunting the motor field and generator armature by a resistance, and varying the field strength of the generator to control the braking effect.

4. The method of operating a series motor as a braking generator to return energy to the line, which consists in inserting the armature of a low voltage generator in series with the motor field without breaking the series connection between motor field and armature, shunting the motor field and generator armature by a resistance, and varying the field strength of the generator and the amount of said resistance to control the braking effect.

5. In combination with a series motor and its source of current, an auxiliary source of voltage, a resistance, means for connecting said auxiliary source in series with the motor field without breaking the series connection between motor field and armature, means for connecting said resistance in shunt to the motor field and said auxiliary source, and means for varying the voltage of said auxiliary source.

6. In combination with a series motor and its source of current, an auxiliary source of voltage, a resistance, means for connecting said auxiliary source in series with the motor field without breaking the series connection between motor field and armature, means for connecting said resistance in shunt to the motor field and said auxiliary source, means for varying the voltage of said auxiliary source, and means for varying the amount of said resistance.

7. In combination with a series motor and its source of current, a low voltage generator, a resistance, means for connecting the armature of said generator in series with the motor field without breaking the series connection between the motor field and armature, means for connecting the resistance in shunt to the motor field and generator armature, and means for varying the field strength of said generator.

8. In combination with a series motor and its source of current, a low voltage generator, a resistance, means for connecting the armature of said generator in series with the motor field without breaking the series connection between the motor field and armature, means for connecting the resistance in shunt to the motor field and generator armature, means for varying the field strength of said generator, and means for varying the amount of said resistance.

9. In combination with a plurality of series motors and a source of current therefor, a low voltage generator having a plurality of armature circuits, a plurality of resistances, means for connecting the several armature circuits of said generator in series with the several motor fields without breaking the series connection between the motor fields and armatures, means for connecting the several resistances each in shunt to a motor field and generator armature circuit, and means for varying the field strength of said generator.

10. In combination with a plurality of series motors and a source of current therefor, a low voltage generator having a plurality of armature circuits, a plurality of resistances, means for connecting the several armature circuits of said generator in series with the several motor fields without breaking the series connection between the motor fields and armatures, means for connecting the several resistances each in shunt to a motor field and generator armature circuit, means for varying the field strength of said generator, and means for varying simultaneously the amounts of said resistances.

In witness whereof, I have hereunto set my hand this 21st day of December, 1909.

ERNST F. W. ALEXANDERSON.

Witnesses:
BENJAMIN B. HULL,
HELEN ORFORD.

Copies of this patent may be obtained for five cents each, by addressing the "Commissioner of Patents, Washington, D. C."